United States Patent
Tsuchimoto et al.

(10) Patent No.: US 10,299,490 B2
(45) Date of Patent: May 28, 2019

(54) SOY MILK FERMENTATION PRODUCT AND METHOD FOR PRODUCING SAME

(71) Applicant: Sapporo Holdings Limited, Shibuya-ku (JP)

(72) Inventors: Norihiko Tsuchimoto, Shibuya-ku (JP); Yasukazu Nakakita, Shibuya-ku (JP); Hiroyuki Harashima, Nishitama-gun (JP)

(73) Assignee: Sapporo Holdings Limited, Tokyo (JP)

( * ) Notice: Subject to any disclaimer, the term of this patent is extended or adjusted under 35 U.S.C. 154(b) by 0 days.

(21) Appl. No.: 14/390,475

(22) PCT Filed: Mar. 18, 2013

(86) PCT No.: PCT/JP2013/057668
§ 371 (c)(1),
(2) Date: Oct. 3, 2014

(87) PCT Pub. No.: WO2013/150887
PCT Pub. Date: Oct. 10, 2013

(65) Prior Publication Data
US 2015/0164098 A1    Jun. 18, 2015

(30) Foreign Application Priority Data

Apr. 5, 2012   (JP) ................. 2012-086401
Feb. 4, 2013   (JP) ................. 2013-019492

(51) Int. Cl.
  A23C 11/10    (2006.01)
  A23L 33/105   (2016.01)
(52) U.S. Cl.
  CPC .......... *A23C 11/106* (2013.01); *A23L 33/105* (2016.08); *A23Y 2220/13* (2013.01)
(58) Field of Classification Search
  USPC ........................................................ 426/46
  See application file for complete search history.

(56) References Cited

U.S. PATENT DOCUMENTS

| | | | |
|---|---|---|---|
| 3,535,117 A | 10/1970 | Yamanaka et al. | |
| 3,585,047 A | 6/1971 | Fujimaki et al. | |
| 3,937,843 A | 2/1976 | Osaka et al. | |
| 5,342,641 A | 8/1994 | Masutake et al. | |
| 6,548,057 B1 | 4/2003 | Shimakawa et al. | |
| 2003/0194468 A1 | 10/2003 | Konkoly et al. | |
| 2004/0197463 A1 | 10/2004 | Gottemoller | |
| 2005/0244559 A1 | 11/2005 | Kato et al. | |
| 2009/0007642 A1 | 1/2009 | Busby et al. | |
| 2009/0252709 A1 | 10/2009 | Nose et al. | |
| 2009/0280217 A1 | 11/2009 | Katase et al. | |
| 2010/0272859 A1 | 10/2010 | Given | |
| 2010/0291051 A1* | 11/2010 | Segawa ............... | A23K 1/009 424/93.45 |
| 2011/0059212 A1 | 3/2011 | Hasegawa | |

FOREIGN PATENT DOCUMENTS

| | | |
|---|---|---|
| CN | 100581369 C | 1/2010 |
| CN | 102687752 A | 9/2012 |
| EP | 0 521 707 A1 | 1/1993 |
| EP | 2 269 471 A1 | 1/2011 |
| JP | 48-1188 | 1/1973 |
| JP | 5-7458 | 1/1993 |
| JP | 2510435 | 6/1996 |
| JP | 2001-190254 | 7/2001 |
| JP | 2002-262771 | 9/2002 |
| JP | 2003-284520 | 10/2003 |
| JP | 2004-16215 | 1/2004 |
| JP | 2004-215529 | 8/2004 |
| JP | 2004-261139 | 9/2004 |
| JP | 2005-531313 A | 10/2005 |
| JP | 2007-68410 | 3/2007 |
| JP | 2008-220301 | 9/2008 |
| JP | 2012-36158 | 2/2012 |
| JP | 2012-249578 A | 12/2012 |
| WO | WO 2006/135089 A1 | 12/2006 |
| WO | 2009/065723 A1 | 5/2009 |
| WO | WO 2009/131052 A1 | 10/2009 |
| WO | WO 2013/150887 A1 | 10/2013 |

OTHER PUBLICATIONS

JP-07-147898—Machine Translation.*
EP-0-521707-1993—Machine Translation.*
Law, B. A. et al. 1983. Antonie van leeuwenhoek. 49: 225-245.*
Japanese Office Action dated Dec. 2, 2014, in Japan Patent Application No. 2012-086401.
International Preliminary Report on Patentability with Written Opinion dated Oct. 16, 2014, in International Application No. PCT/JP2013/057668.
Japanese Office Action dated Jul. 8, 2014, in Japan Patent Application No. 2013-019492.
International Search Report dated Jun. 18, 2013, in International Application No. PCT/JP2013/057668.
Japanese Office Action dated Oct. 3, 2014, in Japan Patent Application No. 2013-19492 (with Partial English translation).
Hideyuki Suzuki, et al., "Development of a Method of Eliminating Soy Bean Smell with Lactic Acid Bacteria", Soy Protein Research, vol. 12, No. 30, 2009 pp. 75-77 (with partial English translation).
Young-Tae Ko, "Acid Production by Lactic Acid Bacteria in Soy Milk Treated by Microbial Protease or Papain and Preparation of Soy Yogurt", Korean J. Food Sci. Technol., vol. 21, No. 3, 1989, pp. 379-386 (with English Abstract).
Yuichi Nodake, et al., "Effects of the Fermented Product Cultivated from Soybean Milk Using Lactic Acid Bacteria, PS-B1, on Liver Function and Lipid Metabolism", Journal for the Integrated Study of dietary Habits, vol. 22, 2011, pp. 13-19 (with partial English translation).

(Continued)

*Primary Examiner* — Hamid R Badr
(74) *Attorney, Agent, or Firm* — Morgan, Lewis & Bockius LLP

(57) ABSTRACT

The invention provides a method for producing a soy milk fermentation product, comprising an enzyme treatment step of hydrolyzing soy milk with a peptide bond hydrolase to obtain a fermentation substrate, and a fermentation step of fermenting the fermentation substrate with lactic acid bacteria belonging to *Lactobacillus brevis* to obtain a fermentation product.

20 Claims, No Drawings

(56) References Cited

OTHER PUBLICATIONS

Akihiro Nakamura, "Development of Soybean Soluble Polysaccharide Derived from "Okara", and Application as a Functional Food Ingredient", Nippon Shokuhin Kagaku Kogaku Kaishi, vol. 58, No. 11, 2011, pp. 559-566 (with Partial English translation).
International Search Report dated Apr. 15, 2014 in PCT/JP2014/050137.
Written Opinion dated Aug. 3, 2015 in Singaporean Patent Application No. 11201406339Q.
Kyung-Hee Kim, et al., "Effects of Protease Treatment of Soy Milk on Acid Production by Lactic Acid Bacteria and Quality of Soy Yogurt" Korean J. Food Sci. Technol., vol. 21, No. 1, 1989, pp. 92-99 (with English Abstract).
Office Action dated Oct. 16, 2015 in Canadian Patent Application No. 2,869,292.
International Preliminary Report on Patentability dated Aug. 13, 2015 in International Application PCT/JP2014/050137, filed on Jan. 8, 2014 (English translation only).
Office Action dated Jan. 27, 2016 in Singaporean Patent Application No. 11201504675S.
Canadian Office Action dated Dec. 19, 2016 in Patent Application No. 2,869,292.
Loginova, L. I., et al., "Content of Free Amino Acids in Peptone and the Dynamics of Their Consumption in the Microbiological Synthesis of Dextran," Pharmaceutical Chemistry Journal, vol. 8, Issue 4, Apr. 1974, pp. 249-251.
Office Action dated Jun. 7, 2017 in U.S. Appl. No. 14/390,475, filed Jun. 1, 2015.
U.S. Appl. No. 14/648,820, filed Jun. 1, 2015, Tsuchimoto.
Office Action issued in corresponding Canadian Patent Application No. 2950367 dated Jul. 23, 2018.
Office Action issued in corresponding Canadian Patent Application No. 2950367 dated Mar. 15, 2019.

* cited by examiner

SOY MILK FERMENTATION PRODUCT AND METHOD FOR PRODUCING SAME

TECHNICAL FIELD

The present invention relates to a soy milk fermentation product and to a method for producing it. The invention further relates to a soy milk fermented beverage and to a method for producing it.

BACKGROUND ART

Soy milk produced by processing soybean is known as a low-calorie, low-cholesterol health food that is also rich in soybean-derived nutrients.

Soy milks containing various additives are known, and for example, Patent document 1 discloses an acidic soy milk beverage with minimal bitterness and astringency, containing pectin or sodium carboxymethyl cellulose as a stabilizer and having the pH adjusted to 4.5 to 5.2. Also, Patent document 2 discloses an acidic soy milk beverage comprising fibrous insoluble cellulose with a mean diameter of 0.01 to 1 μm.

There are also known processed soy milk foods, such as soy milk fermentation products prepared by fermenting soy milk with lactic acid bacteria. Patent document 3 discloses yogurt prepared by mixing lactic acid bacteria with soy milk.

CITATION LIST

Patent Literature

[Patent document 1] Japanese Unexamined Patent Application Publication No. 2004-261139

[Patent document 2] Japanese Unexamined Patent Application Publication No. 2007-68410

[Patent document 3] Japanese Unexamined Patent Application Publication No. 2002-262771

SUMMARY OF INVENTION

Problems to be Solved by the Invention

*Lactobacillus delbrueckii* subspecies *bulgaricus* and *Streptococcus thermophilus* are lactic acid bacteria widely used for lactic acid fermentation of milk. These lactic acid bacteria are also utilized for fermentation of soy milk. However, soy milk fermentation products fermented with these lactic acid bacteria have been problematic because their flavor has not been satisfactory, having powerful soy milk odor and a lack of refreshing quality.

Furthermore, soy milk fermented beverages often separate into two or more layers by coagulation of proteins and the like during storage. Even when various additives such as mentioned in Patent documents 1 and 2 are added, it has not been possible in many cases to adequately prevent separation.

It is therefore an object of the present invention to provide a method for producing a soy milk fermentation product with adequately reduced soy milk odor and satisfactory flavor. It is another object of the invention to provide a soy milk fermentation product with adequately reduced soy milk odor and satisfactory flavor, and foods and beverages containing it.

It is yet another object of the invention to provide a soy milk fermented beverage with reduced coagulation and improved stability, and a method for producing it.

Means for Solving the Problems

The invention provides a method for producing a soy milk fermentation product, comprising an enzyme treatment step of hydrolyzing soy milk with a peptide bond hydrolase to obtain a fermentation substrate, and a fermentation step of fermenting the fermentation substrate with lactic acid bacteria belonging to *Lactobacillus brevis* to obtain a fermentation product.

The present inventors have found that a soy milk fermentation product with adequately reduced soy milk odor in the soy milk fermentation product and a refreshing flavor can be obtained by using, as the fermentative microbes, lactic acid bacteria belonging to *Lactobacillus brevis* which have not been utilized for fermentation of soy milk before. By having a fermentation step with lactic acid bacteria belonging to *Lactobacillus brevis*, the production method of the invention can yield a soy milk fermentation product having adequately reduced soy milk odor and satisfactory flavor.

However, lactic acid bacteria belonging to *Lactobacillus brevis* have been problematic because of their very slow fermentation rate when soy milk is used as the substrate. Long periods have therefore been necessary for production of soy milk fermentation products, the production cost has been high, and the risk of contamination has also been high, making them difficult to utilize in industry. The present inventors have found, nevertheless, that the fermentation rate can be increased if the fermentation substrate used is soy milk that has been pre-hydrolyzed with peptide bond hydrolase. Thus, the production method of the invention comprising the aforementioned steps has high production efficiency and can be utilized in industry.

The production method may further comprise an enzyme inactivation step of inactivating the peptide bond hydrolase in the fermentation substrate. By carrying out an enzyme inactivation step, it is possible to minimize hydrolysis by the peptide bond hydrolase in the fermentation step, and thereby further reduce the bitterness of the soy milk fermentation product.

The peptide bond hydrolase may be one or more types of enzyme selected from the group consisting of peptidases and proteases. The enzyme may also include an exopeptidase or an exoprotease. This will allow the soy milk odor to be even further reduced and can result in a soy milk fermentation product with even more satisfactory flavor.

The free amino acid content in the fermentation substrate may be no greater than 6000 ppm by mass, based on the total mass of the fermentation substrate. If the free amino acid content is within this range, it will be possible to obtain a soy milk fermentation product with adequately reduced bitterness and satisfactory taste sensation.

The lactic acid bacteria may be one or more strains selected from among *Lactobacillus brevis* SBC8803 (deposit number: FERM BP-10632), *Lactobacillus brevis* SBC8027 (deposit number: FERM BP-10630), *Lactobacillus brevis* SBC8044 (deposit number: FERM BP-10631), *Lactobacillus brevis* JCM1061, *Lactobacillus brevis* JCM1065 and *Lactobacillus brevis* JCM1170. *Lactobacillus brevis* SBC8803 is preferred among these. Using these lactic acid bacteria as fermentative microbes will allow the soy milk odor to be even further reduced and can result in a soy milk fermentation product with even greater refreshing quality and more satisfactory flavor.

*Lactobacillus brevis* SBC8803 is a strain that has been deposited at the International Patent Organism Depositary (IPOD) of the National Institute of Advanced Industrial Science and Technology (Central 6, 1-1, Higashi 1-chome, Tsukuba City, Ibaraki Prefecture, Japan 305-8566) on Jun. 28, 2006, as FERM BP-10632. Throughout the present specification, this strain will be referred to as "strain SBL88".

*Lactobacillus brevis* SBC8027 was deposited at the International Patent Organism Depositary (IPOD) of the National Institute of Advanced Industrial Science and Technology (Central 6, 1-1, Higashi 1-chome, Tsukuba City, Ibaraki Prefecture, Japan 305-8566) on Jun. 28, 2006, as FERM BP-10630, and *Lactobacillus brevis* SBC8044 was deposited at the International Patent Organism Depositary (IPOD) of the National Institute of Advanced Industrial Science and Technology (Central 6, 1-1, Higashi 1-chome, Tsukuba City, Ibaraki Prefecture, Japan 305-8566) on Jun. 28, 2006, as FERM BP-10631.

The present invention also provides a soy milk fermentation product that can be obtained by the production method described above. *Lactobacillus brevis* has long been known as a lactic acid bacterium used in fermented foods, and its safety in the body has been adequately established. Because of its high safety in the body, the aforementioned soy milk fermentation product can be ingested continuously for long periods.

The invention also provides foods and beverages comprising a soy milk fermentation product obtained by the production method described above. Consumption of such foods and beverages allows efficient ingestion of the soybean-derived nutrients that are abundantly present in soy milk. In addition, since the soy milk fermentation product has adequately reduced soy milk odor and satisfactory flavor, it can be easily ingested by persons that dislike soy milk odor.

For this production method, the soy milk fermentation product may be a soy milk fermented beverage. When the soy milk fermentation product is a soy milk fermented beverage, the method may further comprise an addition stepof adding a protein coagulation inhibitor to the fermentation product.

The present inventors have found that, while it is often impossible to adequately inhibit separation into two or more layers during storage even when a protein coagulation inhibitor is simply added during production of a soy milk fermented beverage, addition of a protein coagulation inhibitor at a prescribed timing, after the fermentation step, allows production of a soy milk fermented beverage with inhibited coagulation and improved stability. That is, by employing an addition step it is possible to obtain a soy milk fermented beverage with inhibited coagulation and improved stability.

Furthermore, since the production method of the invention employs lactic acid bacteria belonging to *Lactobacillus brevis* as the fermentative microbes, it can produce a soy milk fermented beverage having adequately reduced soy milk odor and a refreshing flavor. Also, because the production method comprises an enzyme treatment step, the fermentation rate is increased and it therefore has high production efficiency and industrial utility.

The protein coagulation inhibitor may be one or more types selected from among soybean polysaccharides, pectin, carboxymethyl cellulose and sodium alginate. It is thus possible to further inhibit coagulation of water-insoluble components. Also, the protein coagulation inhibitor may be a mixture of a soybean polysaccharide and pectin. This will allow coagulation of water-insoluble components to be even further inhibited.

This production method may further comprise, after the enzyme treatment step, a homogenization step of homogenizing the treatment product at least once. This will allow a soy milk fermented beverage to be obtained having further inhibited coagulation and further improved stability.

The homogenization step may be carried out at least once after the fermentation step. This will allow a soy milk fermented beverage to be obtained having even further inhibited coagulation and even further improved stability.

The invention also provides a soy milk fermented beverage that can be obtained by the production method described above. Because the soy milk fermented beverage has inhibited coagulation and improved stability, there is no separation into two or more layers during storage and the like, and a favorable outer appearance is exhibited. *Lactobacillus brevis* has long been known as a lactic acid bacterium used in fermented foods, and its safety in the body has been adequately established. Because of its high safety in the body, the aforementioned soy milk fermented beverage can be ingested continuously for long periods.

The invention still further provides a soy milk fermented beverage, wherein the mean particle diameter of the water-insoluble component is 1.3 μm or smaller.

If the soy milk fermented beverage has a mean particle diameter of the water-insoluble component within this prescribed range, it will be able to exhibit inhibited coagulation and improved stability, as well as minimal separation into two or more layers during storage.

As used herein, "mean particle diameter of the water-insoluble component" means the mean particle diameter calculated by the following formula (1), based on the particle size distribution measured with a particle size distribution analyzer (for example, LS 130 320 by Beckman Coulter, Inc.) after suspending the soy milk fermented beverage in a dispersion to 2-3 v/v % (0.2 w/v % sulfurous acid solution).

[Formula 1]

$$\text{(Mean particle diameter} = 10^{\mu} \tag{1}$$

Here, $\mu$ is the value calculated by the following formula (2).

[Formula 2]

$$\mu = \frac{1}{100} \sum_{j=1}^{n} q_j \left( \frac{\log_{10} x_j + \log_{10} x_{j+1}}{2} \right) \tag{2}$$

In formula (2), $x_j$ and $q_j$ are defined as follows. First, the particle diameter range to be measured (maximum particle diameter: $x_1$, minimum particle diameter: $x_{n+1}$) is divided into n number of equal sections on a logarithmic scale, with each particle diameter section denoted as $[x_j, x_{j+1}]$ (j=1, 2, ... n). Also, the relative particle amounts (difference %) in each particle diameter section $[x_j, x_{j+1}]$ is denoted as $q_j$ (j=1, 2, ... n) (the total of all the regions being 100%). For the purpose of the present specification, n is 116.

More specifically, when using a particle size distribution analyzer (LS 130 320 by Beckman Coulter, Inc.), for example, the value refers to the mean particle diameter Xa calculated by the following formula (3), based on the particle size distribution measured in PIDS (polarization intensity difference scattering) mode, with the soy milk fermented beverage suspended in a dispersion (0.2 w/v % sulfurous acid solution) at 2-3 v/v %.

[Formula 3]

$$Xa = \frac{\sum Xc \times nc}{\sum nc} \quad (3)$$

In formula (3), sigma Xc is the sum of the mean sizes of each channel, and nc/sigma nc is the inventory (%) of particles in each channel. The number of channels is 116.

The soy milk fermented beverage may also be one containing a protein coagulation inhibitor. The protein coagulation inhibitor may be one or more types selected from among soybean polysaccharides, pectin, carboxymethyl cellulose and sodium alginate. This will result in a soy milk fermented beverage with more greatly inhibited coagulation of the water-insoluble component. Also, the protein coagulation inhibitor may be a mixture of a soybean polysaccharide and pectin. This will result in a soy milk fermented beverage with even more greatly inhibited coagulation of the water-insoluble component.

The soy milk fermented beverage may be one obtained by fermenting soy milk with lactic acid bacteria belonging to *Lactobacillus brevis*. The lactic acid bacteria may be one or more strains selected from among *Lactobacillus brevis* SBC8803 (deposit number: FERM BP-10632), *Lactobacillus brevis* SBC8027 (deposit number: FERM BP-10630), *Lactobacillus brevis* SBC8044 (deposit number: FERM BP-10631), *Lactobacillus brevis* JCM1061, *Lactobacillus brevis* JCM1065 and *Lactobacillus brevis* JCM1170. *Lactobacillus brevis* SBC8803 is preferred among these.

Lactic acid bacteria belonging to *Lactobacillus brevis* have not been used for fermentation of soy milk in the prior art. However, using lactic acid bacteria belonging to *Lactobacillus brevis* as the fermentative microbes can provide a soy milk fermented beverage having adequately reduced soy milk odor and a refreshing flavor.

Effect of the Invention

According to the invention there are provided a method for producing a soy milk fermentation product with adequately reduced soy milk odor and satisfactory flavor, and a soy milk fermentation product obtained by the method. There are also provided foods and beverages comprising the soy milk fermentation product.

According to the invention there are also provided a soy milk fermented beverage with inhibited coagulation and improved stability, and a method for producing it.

EMBODIMENTS FOR CARRYING OUT THE INVENTION

Embodiments for carrying out the invention will now be explained in more specific detail, with the understanding that the invention is in no way limited to them.

As used herein, "soy milk" means a milk-like beverage obtained by eluting the proteins and other components from the soybean with hot water or the like, and removing the fibrous substances. The "soy milk" preferably has a soybean solid content of 8 mass % or greater. The "soy milk" includes, for example, raw soy milk and unprocessed soy milk.

[Method for Producing Soy Milk Fermentation Product]

The method for producing a soy milk fermentation product according to the invention comprises at least an enzyme treatment step and a fermentation step. It may also comprise an enzyme inactivation step. Each of these steps will now be explained.

[Enzyme Treatment Step]

The enzyme treatment step is a step of hydrolyzing the soy milk with a peptide bond hydrolase. By carrying out this step it is possible to increase the free amino acid content in the fermentation substrate, thereby increasing the fermentation rate by the lactic acid bacteria belonging to *Lactobacillus brevis*.

The peptide bond hydrolase is an enzyme that hydrolyzes peptide bonds (—C(=O)—NH—). Peptide bond hydrolases include peptidases that hydrolyze peptides and proteases that hydrolyze proteins. Here, a "peptide" is a polymer having less than 100 amino acid residues linked by peptide bonds. Similarly, a "protein" is a polymer having 100 or more amino acid residues linked by peptide bonds.

The peptide bond hydrolase used may be, for example, one or more types of enzyme selected from the group consisting of peptidases and proteases.

Peptidases and proteases can be classified as exopeptidases and exoproteases having activity of cleaving 1 or 2 amino acid residues from the ends of the peptide or protein sequences, and endopeptidases and endoproteases having activity of cleaving peptides or proteins within the sequences.

The peptide bond hydrolase to be used in the enzyme treatment step may be one having exopeptidase activity or exoprotease activity. This will exhibit an even greater effect of reducing soy milk odor in the obtained soy milk fermentation product and improving flavor. Also, an enzyme with higher exo activity than endo activity will exhibit the aforementioned effect more prominently, while an enzyme including no endo activity will exhibit the effect yet more prominently.

The peptide bond hydrolase used may be a commercial product. Examples include PROTEAX (product of Amano Enzyme, Ltd., mixture of endo and exo types, strong exo activity), SUMIZYME ACP-G (product of Shinnihon Chemical Co., Ltd., exo type only), protease M "AMANO" SD (product of Amano Enzyme, Ltd., mixture of endo and exo types, strong exo activity) and SUMIZYME FLAP (product of Shinnihon Chemical Co., Ltd., exo type only).

The enzyme treatment step may be carried out to a free amino acid content of up to 6000 ppm by mass in the obtained fermentation substrate, based on the total mass. This can reduce or eliminate bitterness of the soy milk fermentation product. The free amino acid content in this case is more preferably no greater than 5800 ppm by mass and even more preferably no greater than 5500 ppm by mass. The lower limit for the free amino acid content is not particularly restricted but will usually be 1000 ppm by mass.

The "free amino acid content" can be measured, for example, by taking and centrifuging a soy milk sample, and then treating the supernatant with 0.02 N hydrochloric acid and quantifying the content of each amino acid with an amino acid analyzer (for example, an L-8800 by Hitachi High-Technologies Corp.).

The amount of peptide bond hydrolase added may be appropriately determined based on the type of peptide bond hydrolase that is used. When using PROTEAX, for example, it may be 0.01 U to 0.7 U per 1 g of soy milk, and when using SUMIZYME ACP-G it may be 0.01 U to 0.5 U per 1 g of soy milk.

The treatment time and treatment temperature for the soy milk using the peptide bond hydrolase may be appropriately determined according to the type of peptide bond hydrolase used and the amount added, and may be 40° C. to 50° C. for 1 to 3 hours, for example.

The amount of peptide bond hydrolase added, and the treatment time and treatment temperature for the soy milk by the peptide bond hydrolase, may be adjusted so that the free amino acid content is within the range specified above.

[Enzyme Inactivation Step]

The enzyme inactivation step is a step of inactivating the peptide bond hydrolase in the fermentation substrate. This step may be carried out after the enzyme treatment step and before the fermentation step, as necessary. By carrying out this step, it is possible to minimize hydrolysis by the peptide bond hydrolase in the fermentation step, and thereby further reduce the bitterness of the soy milk fermented beverage.

The method of inactivating the enzyme may be appropriately determined according to the type of peptide bond hydrolase that is used. Examples include inactivation by pH adjustment, inactivation by heating, inactivation by addition of an organic solvent (such as ethanol), and inactivation by adjustment of the salt concentration. The preferred method is inactivation by heating for ease of processing.

The heating temperature and heating time for heating may be appropriately determined according to the type of peptide bond hydrolase that is used, and may be 60° C. to 100° C. for 30 minutes to 120 minutes, for example.

In the enzyme inactivation step, it is sufficient to adequately reduce the activity of the peptide bond hydrolase and it is not necessary to achieve complete inactivation. From the viewpoint of further reducing bitterness of the soy milk fermented beverage, on the other hand, the residue rate of the peptide bond hydrolase (the ratio of activity after inactivation treatment with respect to the added activity) may be 10% or less. It may even be 5% or less, 2.5% or less, or 0% (complete inactivation).

[Fermentation Step]

The fermentation step is a stepof fermenting the fermentation substrate with lactic acid bacteria belonging to *Lactobacillus brevis*. In the fermentation step, the lactic acid bacteria are added to the fermentation substrate obtained by the previous enzyme treatment step, and lactic acid fermentation is carried out by the lactic acid bacteria to obtain a fermentation product.

Additives other than lactic acid bacteria may also be added to the fermentation substrate. Examples of such additives include sugars (sucrose, maltose, fructose, glucose, stachyose, raffinose and the like), plant extracts (for example, malt extract), aromatics (for example, yogurt flavor) and sweeteners (for example, trehalose aspartame, sucralose and acesulfame potassium). When an enzyme inactivation step is to be carried out, such additives may be added before the enzyme inactivation step. This is advantageous when the enzyme inactivation step is to be accomplished by heat treatment, since the additives can be sterilized simultaneously.

The lactic acid bacteria belonging to *Lactobacillus brevis* may be strain SBL88, *Lactobacillus brevis* SBC8027, *Lactobacillus brevis* SBC8044, *Lactobacillus brevis* JCM1061, *Lactobacillus brevis* JCM1065 or *Lactobacillus brevis* JCM1170, because these can produce soy milk fermentation products having even further reduced soy milk odor, and satisfactory flavor with an even greater refreshing quality. *Lactobacillus brevis* SBC8803 is preferred among these. The lactic acid bacteria belonging to *Lactobacillus brevis* may be of a single type alone, or two or more types in admixture.

Incidentally, *Lactobacillus brevis* JCM1061, *Lactobacillus brevis* JCM1065 and *Lactobacillus brevis* JCM1170 can be purchased from a publicly known cell bank such as Riken BioResource Center or JCRB.

There are no particular restrictions on the conditions in the fermentation step, such as the amount of lactic acid bacteria used and the fermentation temperature, and appropriate conditions may be set according to the type of lactic acid bacteria used. For example, when using strain SBL88 as the lactic acid bacteria, the lactic acid bacteria may be added at $1 \times 10^6$ to $1 \times 10^7$ cfu/mL and stationing may be at 25° C. to 38° C.

The fermentation time is preferably shorter from the viewpoint of reducing production cost and reducing contamination risk. Because the production method of the invention has the enzyme treatment step described above, it is possible to shorten the fermentation time. Thus, the fermentation time in the fermentation step may be 24 hours or shorter, for example. The fermentation time may also be 22 hours or shorter, or even 20 hours or shorter.

[Soy Milk Fermentation Product]

The soy milk fermentation product obtained by the production method described above is rich in soybean-derived nutrients, while also having adequately reduced soy milk odor and a satisfactory refreshing flavor. Therefore, the soy milk fermentation product may be used directly as a food or beverage, or it may be used as a food or beverage material.

[Food or Beverage]

A food or beverage of the invention may be the soy milk fermentation product itself, or a food or beverage containing the soy milk fermentation product. Examples of foods and beverages that are soy milk fermentation products themselves include fermented soy milk, yogurt and cheese. Examples of foods and beverages containing the soy milk fermentation product include emulsified seasonings (margarine, dressings, mayonnaise and the like), other seasonings (sauces, ketchup and the like), confectioneries (ice cream, candy, caramel, chocolate and the like), and beverages (non-alcoholic beverages, alcoholic beverages and the like).

[Method for Producing Soy Milk Fermented Beverage]

The soy milk fermentation product obtained by the method for producing a soy milk fermentation product may be a soy milk fermented beverage. That is, the method for producing a soy milk fermentation product may be conducted in the manner of a method for producing a soy milk fermented beverage. Furthermore, the method for producing a soy milk fermented beverage according to the invention may further comprise, in addition to the aforementioned enzyme treatment step, enzyme inactivation step and fermentation step, also a starting material preparation step, an addition step, a pH adjusting step, a homogenization step or a mixing step. Each of these steps will now be explained.

[Starting Material Preparation Step]

The starting material preparation step is a step of adding additives to the soy milk starting material. The starting material preparation step is carried out as necessary. Examples of additives include sugars (sucrose, maltose, fructose, glucose, stachyose, raffinose and the like), plant extracts (for example, malt extract), aromatics (for example, yogurt flavor), sweeteners (for example, trehalose, aspartame, sucralose, acesulfame potassium and the like), acidulants (malic acid, citric acid, succinic acid, phosphoric acid and acetic acid), pigments, seasonings (amino acids and the like), gelling agents (gellan gum, sodium alginate, carrageenan and agar), and salts (sodium chloride, potassium chloride and magnesium chloride). These additives may be added alone or in combinations of two or more.

The amount of additives added may be set as appropriate for the type of additives. The total amount of additives will usually be 0 to 10 mass % with respect to the total of the soy milk and additives.

The starting material preparation step may be carried out before the fermentation step, and for example, it may be carried out before the enzyme treatment step, or after the enzyme treatment step and before the fermentation step. After addition of the additives, sterilization may be performed. The sterilization may be performed, for example, by heating to 85° C. (an end temperature of 85° C.), or heating with a plate such as UHT (ultrahigh temperature sterilization), with a tube, with direct steam pasteurizer, a heat exchanger or a retort pasteurizer.

[Addition Step]

The addition step is a step of adding a protein coagulation inhibitor to the fermentation product that has been obtained by the fermentation step. By employing an addition step it is possible to obtain a soy milk fermented beverage with reduced coagulation and improved stability. If the addition step is carried out before the fermentation step, it will not be possible to inhibit coagulation or to obtain a soy milk fermented beverage with sufficient stability. If the addition step is carried out after the fermentation step, on the other hand, coagulation can be inhibited and a soy milk fermented beverage with increased stability can be obtained. The timing for the addition step is not particularly restricted so long as it is after the fermentation step. When a second homogenization step is employed as described below, the addition step may be carried out after the fermentation step and before the second homogenization step, as this will allow the production steps to be simplified.

The protein coagulation inhibitor need only be one that inhibits coagulation of the protein, and more specifically, it may be one that inhibits coagulation of the protein under acidic conditions and inhibits breakup of the emulsion caused by coagulation of the protein, thereby stabilizing the emulsified state. The protein coagulation inhibitor may be one, for example, that can impart viscosity or form a three-dimensional network, to allow the water-insoluble component to be maintained in a dispersed state. Examples of protein coagulation inhibitors include stabilizers, viscosity stabilizers and thickeners used as food additives.

Examples of stabilizers, viscosity stabilizers and thickeners include soybean polysaccharides, pectin, carrageenan, sodium carboxymethyl cellulose, xanthan gum, guar gum, sodium alginate, locust bean gum and the like. Stabilizers, viscosity stabilizers and thickeners may be soybean polysaccharides, pectin, sodium carboxymethyl cellulose and sodium alginate. By using these it is possible to improve the stability while also inhibiting coagulation of the water-insoluble component. Of these, soybean polysaccharides and pectin have greater effects, and a mixture of soybean polysaccharides and pectin has an even greater effect. These may be used alone or in combinations of two or more.

As protein coagulation inhibitors there may be used commercially available stabilizers, viscosity stabilizers and thickeners. Examples of such commercial products include SM600 (mixture of soybean polysaccharide and pectin, product of San-Ei Gen F.F.I. Inc.), trehalose, glycerin, phospholipids and the like.

The amount of protein coagulation inhibitor added may be appropriately set according to the type of protein coagulation inhibitor used. For example, when a food stabilizer, thickener or viscosity stabilizer is used as the protein coagulation inhibitor, it may be added to a protein coagulation inhibitor content of 0.1 to 5.0 mass % or 0.5 to 3.0 mass % with respect to the total fermentation product.

[Homogenization Step]

The homogenization step is a step of homogenizing the treatment product. The homogenization step is carried out as necessary, but carrying it out at least once can result in a soy milk fermented beverage with further inhibited coagulation and further increased stability.

The homogenization step may be, for example, a step of homogenizing the treatment product (fermentation substrate) after the enzyme treatment step and before the fermentation step (first homogenization step), or a step of homogenizing the treatment product (fermentation product) after the fermentation step (second homogenization step). Employing at least the second homogenization step will result in a greater effect. Alternatively, both the first homogenization step and the second homogenization step may be employed.

The second homogenization step may be carried out after the addition step and the pH adjusting step. This will allow mixing of the protein coagulation inhibitor and the pH regulator with the fermentation product to be accomplished simultaneously.

Homogenization of the treatment product may be carried out, for example, by using an emulsifying device such as a homogenizer (for example, a Model H-20 by Sanwa Machinery Trading Co., Ltd.) or a homomixer (for example, a HIEMARUDA by Izumi Food Machinery Co., Ltd.) for stirring and mixing of the treatment product. The homogenization conditions may be appropriately set according to the type of device used, and for example, when a homogenizer (for example, a Model H-20 by Sanwa Machinery Trading Co., Ltd.) is used, treatment may be carried out at a pressure of 10 to 20 MPa.

[pH Adjusting Step]

The pH adjusting step is a step of adjusting the pH by addition of a pH regulator to the fermentation product obtained from the fermentation step. In most cases the fermentation product obtained from the fermentation step will be at about pH 5.0. The pH adjusting step may be carried out as necessary, depending on the pH of the soy milk fermented beverage as the final product (for example, pH 3.9).

An acid or alkali suitable for addition to foods may be used as a pH regulator. Specific examples include acids such as phosphoric acid, hydrochloric acid, citric acid, malic acid, tartaric acid, acetic acid and succinic acid, and alkalis such as sodium hydroxide, potassium hydroxide, sodium hydrogencarbonate and sodium carbonate.

[Mixing Step]

The mixing step is a step of mixing food additives and a food with the soy milk fermented beverage. The soy milk fermented beverage obtained from the enzyme treatment step, fermentation step and addition step may be used directly as a food or beverage, or it may be subjected to a mixing step as necessary.

The food additives and food may be foods, fruit juices, vegetables or the like that are composed mainly of sweeteners such as aspartame, sucralose or acesulfame potassium, aromatics, preservatives, aromatics, emulsifiers, acidulants, gelling agents, processed starches or salts, media such as water, sugars, dextrin, lipids, raw dairy materials, milk or the like.

The amounts of food additives added may be set as appropriate for the type of food additives. The total amount of food additives will usually be 0.001 to 20.0 mass % with respect to the total of the soy milk and additives.

[Soy Milk Fermented Beverage]

The soy milk fermented beverage according to an embodiment of the invention has a mean particle diameter of the water-insoluble component of no greater than 1.3 μm. If a mean particle diameter of the water-insoluble component iswithin this range, the soy milk fermented beverage will have inhibited coagulation and increased stability. The mean particle diameter of the water-insoluble component is preferably no greater than 1.2 μm, more preferably no greater than 1.0 μm and even more preferably no greater than 0.8 μm. There is no particular restriction on the lower limit for the mean particle diameter of the water-insoluble component, but it will usually be at least 0.1 μm.

The mean particle diameter of the water-insoluble component is defined as above. The water-insoluble component is the component measured by the aforementioned particle size distribution measurement, and for example, it consists of fat globules (soy milk oil) and protein aggregates.

The soy milk fermented beverage may contain a protein coagulation inhibitor. The protein coagulation inhibitor used may be one of those mentioned above.

The protein coagulation inhibitor content is preferably 0.1 to 5.0 mass %, more preferably 0.5 to 3.0 mass % and even more preferably 1.0 to 2.0 mass %, with respect to the total soy milk fermented beverage.

The soy milk fermented beverage is preferably one obtained by fermenting soy milk with lactic acid bacteria belonging to *Lactobacillus brevis*. The lactic acid bacteria belonging to *Lactobacillus brevis* that is used may be one of those mentioned above.

The soy milk fermented beverage may also contain additives that are suitable for addition to foods, such as sweeteners, aromatics, preservatives, acidulants, pigments, seasonings, gelling agents, salts and the like.

The soy milk fermented beverage of the invention can be obtained, for example, by the method for producing a soy milk fermented beverage according to the invention, as described above.

EXAMPLES

The present invention will now be explained in greater detail based on examples. However, the present invention is not limited to the examples described below.

[Preparation and Evaluation of Soy Milk Fermentation Product (1)]

Soy milk fermentation products were prepared under the conditions shown in Table 1 below, using soy milk (Oishii Unprocessed Soy Milk, product of Kikkoman Corp.) as starting material.

<Materials>
Lactic acid bacteria
SBL88: *Lactobacillus brevis* SBC8803
SBC8982: *Lactobacillus delbrueckii* subspecies *bulgaricus* SBC8982
SBC8972: *Streptococcus thermophilus* SBC8972
Peptidase
SUMIZYME ACP-G (product of Shinnihon Chemical Co., Ltd.)
Protease
PROTEAX (product of Amano Enzyme, Ltd.)

<Enzyme Treatment Step>

Protease or peptidase (or both if both were to be added) were added to soy milk, and enzyme treatment was carried out at 45° C. for 2 hours.

<Enzyme Inactivation Step>

Upon completion of the enzyme treatment, sugar and high-fructose corn syrup were added to 2% (w/w) each, and heat treatment was carried out at 80° C. for 60 minutes.

<Fermentation Step>

Following heat treatment, the mixture was cooled to the fermentation temperature to obtain a fermentation substrate. Lactic acid bacteria were added to the fermentation substrate at $3\times10^6$ cfu/g. Stationary culturing was carried out during the fermentation time listed in Table 1. Upon completion of fermentation, the mixture was rapidly cooled and evaluated.

<Sensory Evaluation of Soy Milk Fermentation Product>

The obtained soy milk fermentation product was sensory evaluated by a panel of 10 evaluators. The sensory evaluation assigned evaluation points to soy milk odor based on the following evaluation criteria, and the average value of the points by the 10 evaluators was determined. The evaluators were also asked to provide free comments on flavor. The results are shown in Table 1.

—Evaluation Points—
1: No soy milk odor detected
2: Slight soy milk odor detected
3: Notable soy milk odor detected
4: Strong soy milk odor detected
5: Very strong soy milk odor detected <Measurement of Free Amino Acid Content>

The free amino acid content in the fermentation substrate was measured by the following method. First, a measuring sample was taken and centrifuged, and then the supernatant was treated with 0.02 N hydrochloric acid. The content of each amino acid was quantified using an amino acid analyzer (L-8800, product of Hitachi High-Technologies Corp.). From the quantified values, the content of the total free amino acids (ppm by mass) was calculated based on the total amount of fermentation substrate. The results are shown in Table 1.

TABLE 1

| | Lactic acid bacteria | Enzyme treatment conditions | Protease | Peptidase | Fermentation temp. (° C.) | Fermentation time (h) | Post-fermentation pH | Post-fermentation cfu | Free amino acids (ppm by mass) | Soy milk odor (average of 10) |
|---|---|---|---|---|---|---|---|---|---|---|
| Example 1 | SBL88 | 45° C., 2 hr | 0.01% w/w | — | 30 | 18 | 5.19 | $8.7 \times 10^8$ | 2624 | 1.73 |
| Example 2 | SBL88 | 45° C., 2 hr | — | 0.01% w/w | 30 | 18 | 4.95 | $8.4 \times 10^8$ | 2921 | 1.36 |
| Example 3 | SBL88 | 45° C., 2 hr | 0.01% w/w | 0.01% w/w | 30 | 18 | 4.37 | $1.9 \times 10^9$ | 5269 | 1.64 |
| Example 4 | SBL88 | 45° C., 2 hr | 0.005% w/w | 0.005% w/w | 30 | 18 | 4.90 | $6.4 \times 10^8$ | 3546 | 1.45 |
| Comp. Ex. 1 | SBL88 | 45° C., 2 hr | — | — | 30 | 18 | 5.84 | $1.4 \times 10^8$ | 880 | 2.64 |
| Comp. Ex. 2 | SBC8982 | 45° C., 2 hr | — | — | 43 | 5 | 6.34 | $1.1 \times 10^8$ | — | 2.82 |
| Comp. Ex. 3 | SBC8982 | 45° C., 2 hr | 0.01% w/w | 0.01% w/w | 43 | 5 | 6.08 | $3.0 \times 10^7$ | — | 3.45 |

TABLE 1-continued

| | Lactic acid bacteria | Enzyme treatment conditions | Protease | Peptidase | Fermentation temp. (° C.) | Fermentation time (h) | Post-fermentation pH | Post-fermentation cfu | Free amino acids (ppm by mass) | Soy milk odor (average of 10) |
|---|---|---|---|---|---|---|---|---|---|---|
| Comp. Ex. 4 | SBC8972 | 45° C., 2 hr | — | — | 43 | 5 | 5.10 | $5.5 \times 10^8$ | — | 2.27 |
| Comp. Ex. 5 | SBC8972 | 45° C., 2 hr | 0.01% w/w | 0.01% w/w | 43 | 5 | 4.85 | $8.1 \times 10^8$ | — | 2.82 |

The soy milk fermentation products obtained by the production method of the invention (Examples 1 to 4) had adequately reduced soy milk odor (Table 1). Also, numerous free comments referred to a "refreshing feel". On the other hand, in Comparative Example 1 which employed strain SBL88 but without enzyme treatment, the reduction in soy milk odor was inadequate and the fermentation rate was extremely slow (that is, the pH lowering rate was slow and the cfu increase rate was slow).

With strains SBC8982 and SBC8972, as lactic acid bacteria commonly used for lactic acid fermentation of milk, a strong soy milk odor remained and the flavor was not desirable (Comparative Examples 2 to 5). Moreover, conversely, the soy milk odor was increased with enzyme treatment when using these lactic acid bacteria (Comparative Examples 2 and 3 and Comparative Examples 4 and 5).

[Preparation and Evaluation of Soy Milk Fermentation Product (2)]

Soy milk fermentation products were prepared and evaluated in the same manner as [Preparation and evaluation of soy milk fermentation product (1)], under the conditions shown in Table 2 below. The results are shown in Table 2, together with representative free comments.

[Preparation and Evaluation of Soy Milk Fermented Beverages (1)]

Example 2-1

After adding 2 mass % of sugar, 2 mass % of isomerized sugar and 0.15 mass % of arginine to 93.66 mass % of soy milk (Oishii Unprocessed Soy Milk, product of Kikkoman Corp.) and mixing, the mixture was sterilized at an end temperature of 85° C. (starting material preparation step).

Following sterilization, it was cooled to 45° C., PROTEAX (product of Amano Enzyme, Ltd.) and SUMIZYME ACP-G (product of Shinnihon Chemical Co., Ltd.) were added to 0.01 mass % each, and upon mixing, the mixture was kept at 45° C. for 2 hours (enzyme treatment step).

Upon completion of the enzyme treatment, a homogenizer (Model H-20 by Sanwa Machinery Trading Co., Ltd.) was used for homogenization at a pressure of 15 MPa (first homogenization step). Next, enzyme inactivation treatment was carried out at 90° C. for 10 minutes (enzyme inactivation step).

Following heat treatment, the mixture was cooled to a temperature of 30° C. to obtain a fermentation substrate. The

TABLE 2

| | Lactic acid bacteria | Enzyme treatment conditions | Protease | Peptidase | Fermentation temp. (° C.) | Fermentation time (h) | Post-fermentation pH | Post-fermentation cfu | Free amino acids (ppm by mass) | Free comment |
|---|---|---|---|---|---|---|---|---|---|---|
| Example 3 | SBL88 | 45° C., 2 hr | 0.01% w/w | 0.01% w/w | 30 | 18 | 4.37 | $1.9 \times 10^9$ | 5269 | No residual bitterness. |
| Ref. Ex. 1 | SBL88 | 45° C., 2 hr | 0.01% w/w | 0.01% w/w | 30 | 20 | 4.94 | $2.5 \times 10^8$ | 4563 | No residual bitterness. |
| Ref. Ex. 2 | SBL88 | 45° C., 4 hr | 0.01% w/w | 0.01% w/w | 30 | 20 | 4.96 | $2.2 \times 10^8$ | 6456 | Residual bitterness in aftertaste. |
| Ref. Ex. 3 | SBL88 | 45° C., 6 hr | 0.01% w/w | 0.01% w/w | 30 | 20 | 4.85 | $1.8 \times 10^8$ | 7622 | Residual bitterness in aftertaste. |
| Ref. Ex. 4 | SBL88 | 45° C., 2 hr | 0.1% w/w | 0.1% w/w | 30 | 18 | 4.83 | $1.3 \times 10^9$ | 15260 | Severe bitterness. |

In Reference Examples 2 and 3 that had increased enzyme treatment times, and Reference Example 4 that had an increased enzyme addition amount, the free amino acid content in the fermentation substrate was increased (Example 3 and Reference Examples 1 to 4). In Reference Examples 2 to 4 that had free amino acid contents exceeding 6000 ppm by mass, the soy milk odor was reduced, but many free comments such as "aftertaste with residual bitterness" were received. In particular, the soy milk fermentation product of Reference Example 4 which had a free amino acid content exceeding 15,000 ppm by mass had adequately reduced soy milk odor (soy milk odor of 1.58 (average value for 10 evaluators)), but also had very strong bitterness, and comments of "difficult to drink" were received from some of the evaluators (Table 2).

lactic acid bacterium SBL88 (Lactobacillus brevis SBC8803) was added to the fermentation substrate at $3 \times 10^6$ cfu/g, and fermentation was carried out at 30° C. for 15 hours (fermentation step).

Upon completion of the fermentation, SM600 (product of San-Ei Gen F.F.I. Inc.) was added as a protein coagulation inhibitor at 1.67 mass % with respect to 98.33 mass % of the fermentation product, and the components were mixed (addition step). Phosphoric acid was further added, to adjust the pH to 4.2±0.1 (pH adjusting step).

Next, a homogenizer (Model H-20, product of Sanwa Machinery Trading Co., Ltd.) was used for homogenization at a pressure of 15 MPa, sterilization was conducted at 85° C., and the mixture was rapidly cooled (second homogenization step).

To 30.0 mass % of the fermentation product obtained from the second homogenization step there were added 59.0 mass % of water, 10.8 mass % of sugar and 0.2 mass % of an aromatic component, and the components were mixed and heated to 60° C., after which a high-pressure homogenizer was used for homogenization at a pressure of 15 MPa. Following sterilization with an end temperature of 85° C., the mixture was rapidly cooled to obtain a soy milk fermented beverage for Example 2-1 (mixing step).

Comparative Example 2-1

A soy milk fermented beverage for Comparative Example 2-1 was obtained in the same manner as Example 2-1, except that addition of the protein coagulation inhibitor was carried out after the enzyme treatment step and before the first homogenization step.

Comparative Example 2-2

A soy milk fermented beverage for Comparative Example 2-2 was obtained in the same manner as Example 2-1, except that the timing of addition of the protein coagulation inhibitor was simultaneously with the starting material preparation step.

The soy milk fermented beverages of Example 2-1 and Comparative Examples 2-1 and 2-2 were evaluated for mean particle diameter and stability.

(Mean Particle Diameter)
The soy milk fermented beverage was suspended in water, and a particle size distribution analyzer (LS 130 320 by Beckman Coulter, Inc.) was used to measure the mean particle diameter of the water-insoluble component.

(Stability)
The soy milk fermented beverage was centrifuged with a centrifugal separator (05PR-22 by Hitachi Koki Co., Ltd.) at 1,510×g for 5 minutes, and then the outer appearance was visually examined. The conditions for centrifugal separation corresponded to the soy milk fermented beverage standing for 180 days.

The results are shown in Table 3.

TABLE 3

| | | Test results | |
|---|---|---|---|
| | Addition timing | Mean particle diameter (μm) | Stability |
| Example 2-1 | After fermentation step | 0.643 | Stable |
| Comp. Ex. 2-1 | Before fermentation step (after enzyme treatment step and before first homogenization step) | 1.322 | Separated into two layers |
| Comp. Ex. 2-2 | Before fermentation step (simultaneously with starting material preparation step) | 4.208 | Separated into two layers |

With the soy milk fermented beverage of Example 2-1, which had the protein coagulation inhibitor added after the fermentation step, the mean particle diameter of the water-insoluble component was 0.643 μm and the beverage was stable with no changes in outer appearance even after centrifugation. On the other hand, the soy milk fermented beverages of Comparative Examples 2-1 and 2-2, to which the protein coagulation inhibitor was added before the fermentation step, had mean particle diameters of the water-insoluble components of 1.322 μm and 4.208 μm, respectively, and separated into two layers by centrifugal separation.

As clearly seen from Table 3, the stability of the soy milk fermented beverage differed depending on the timing of addition of the protein coagulation inhibitor. By adding a protein coagulation inhibitor after the fermentation step, coagulation was inhibited and stability was increased. Also, there was a correlation between mean particle diameter of the water-insoluble component in the soy milk fermented beverage, and stability.

[Preparation and evaluation of soy milk fermented beverages (2)]

Example 2-2

A soy milk fermented beverage was obtained for Example 2-2 in the same manner as Example 2-1, except that a second homogenization step was not carried out.

Example 2-3

A soy milk fermented beverage was obtained for Example 2-3 in the same manner as Example 2-1, except that a first homogenization step was not carried out.

Example 2-4

A soy milk fermented beverage was obtained for Example 2-4 in the same manner as Example 2-1, except that the first homogenization step and second homogenization step were not carried out.

The soy milk fermented beverages of Examples 2-1 to 2-4 were evaluated for mean particle diameter and smoothness.

(Mean Particle Diameter)
The mean particle diameter was measured by the same method as for [Preparation and evaluation of soy milk fermented beverage (1)].

(Smoothness)
Evaluation was conducted by a sensory test with 5 trained panels. The evaluation criteria were based on comparison with the soy milk fermented beverage of Example 2-1 on a 4-level scale, of "No difference" when there was no difference in smoothness, "Slightly rough" when slight roughness was felt and the smoothness was slightly inferior, and "Somewhat rough" when there was some roughness and the smoothness was somewhat inferior. When the roughness was strong and the smoothness was clearly inferior, an evaluation of "Rough" was assigned.

The results are shown in Table 4.

TABLE 4

| | | | Test results | |
|---|---|---|---|---|
| | Production conditions | | Mean | |
| | First homogenization step | Second homogenization step | particle diameter (μm) | Smoothness |
| Example 2-1 | Performed | Performed | 0.643 | — |
| Example 2-2 | Performed | Not performed | 0.743 | No difference from Example 2-1 |
| Example 2-3 | Not performed | Performed | 0.653 | No difference from Example 2-1 |

TABLE 4-continued

| | Production conditions | | Test results | |
| --- | --- | --- | --- | --- |
| | First homogenization step | Second homogenization step | Mean particle diameter (μm) | Smoothness |
| Example 2-4 | Not performed | Not performed | 1.030 | No difference from Example 2-1 |

The soy milk fermented beverage of Example 2-1 had excellent smoothness. Also, the soy milk fermented beverages of Examples 2-2 to 2-4 also had smoothness that was no different from the soy milk fermented beverage of Example 2-1.

By carrying out a first homogenization step and second homogenization step at least once, the mean particle diameter of the water-insoluble component was further reduced (results for Examples 2-1 to 2-3 compared to Example 2-4). In addition, the soy milk fermented beverages of Examples 2-1 and 2-3, in which a second homogenization step was carried out, had smaller mean particle diameters of the water-insoluble components than the soy milk fermented beverage of Example 2-2 in which a first homogenization step was not carried out. Since there is a correlation between mean particle diameter and stability, as indicated by the results in [Preparation and evaluation of soy milk fermented beverage (1)], carrying out a homogenization step at least once further reduces coagulation of the soy milk fermented beverage and further increases stability.

The invention claimed is:

1. A method for producing a soy milk fermented beverage, the method comprising:
hydrolyzing soy milk with protease and/or peptidase to obtain a fermentation substrate, and
fermenting the fermentation substrate with lactic acid bacteria belonging to *Lactobacillus brevis* to obtain a fermentation product,
wherein the free amino acid content in the fermentation substrate is no less than 2624 ppm by mass and no greater than 5269 ppm by mass, based on the total mass, and the soy milk fermented beverage excludes yogurt.

2. The method according to claim 1, further comprising inactivating the protease and/or peptidase in the fermentation substrate.

3. The method according to claim 1, wherein the soy milk is hydrolyzed with the peptidase.

4. The method according to claim 1, wherein the protease and/or peptidase comprise an exopeptidase and/or an exoprotease.

5. The method according to claim 1, wherein the free amino acid content in the fermentation substrate is no greater than 4563 ppm by mass, based on the total mass.

6. The method according to claim 1, wherein the lactic acid bacteria are one or more strains selected from the group consisting of *Lactobacillus brevis* SBC8803 (deposit number: FERM BP-10632), *Lactobacillus brevis* SBC8027 (deposit number: FERM BP-10630), *Lactobacillus brevis* SBC8044 (deposit number: FERM BP-10631), *Lactobacillus brevis* JCM1061, *Lactobacillus brevis* JCM1065 and *Lactobacillus brevis* JCM1170.

7. The method according to claim 1, wherein the soy milk is hydrolyzed with protease.

8. The method according to claim 1, further comprising inactivating the protease and/or peptidase in the fermentation substrate prior to the fermenting.

9. The method according to claim 1, further comprising adding a protein coagulation inhibitor to the fermentation product.

10. The method according to claim 9, wherein the protein coagulation inhibitor is at least one selected from the group consisting of a soybean polysaccharide, pectin, carboxymethyl cellulose and sodium alginate.

11. The method according to claim 9, wherein the protein coagulation inhibitor is a mixture of soybean polysaccharides and pectin.

12. The method according to claim 9, further comprising, after the hydrolyzing, homogenizing fermentation substrate at least once.

13. The method according to claim 12, wherein the homogenizing is carried out at least once after the fermenting.

14. A food or beverage comprising a soy milk fermented beverage obtained by the method according to claim 1.

15. A soy milk fermented beverage obtained by the method according to claim 1.

16. The soy milk fermented beverage according to claim 15, wherein the mean particle diameter of water-insoluble component is 1.3 μm or smaller.

17. The soy milk fermented beverage according to claim 16, comprising a protein coagulation inhibitor.

18. The soy milk fermented beverage according to claim 17, wherein the protein coagulation inhibitor is at least one selected from the group selected from a soybean polysaccharide, pectin, carboxymethyl cellulose and sodium alginate.

19. The soy milk fermented beverage according to claim 17, wherein the protein coagulation inhibitor is a mixture of soybean polysaccharides and pectin.

20. The soy milk fermented beverage according to claim 16, wherein the lactic acid bacteria are one or more strains selected from the group consisting of *Lactobacillus brevis* SBC8803 (deposit number: FERM BP-10632), *Lactobacillus brevis* SBC8027 (deposit number: FERM BP-10630), *Lactobacillus brevis* SBC8044 (deposit number: FERM BP-10631), *Lactobacillus brevis* JCM1061, *Lactobacillus brevis* JCM1065 and *Lactobacillus brevis* JCM1170.

* * * * *